(12) United States Patent
Lin

(10) Patent No.: US 6,494,129 B2
(45) Date of Patent: Dec. 17, 2002

(54) DEVICE FOR PREPARING COFFEE, TEA OR MILK BEVERAGE

(76) Inventor: Han Chun Lin, P.O. Box 63-99, Taichung (TW), 406

( * ) Notice: Subject to any disclaimer, the term of this patent is extended or adjusted under 35 U.S.C. 154(b) by 0 days.

(21) Appl. No.: 09/930,984

(22) Filed: Aug. 17, 2001

(65) Prior Publication Data

US 2002/0050210 A1 May 2, 2002

(30) Foreign Application Priority Data

Oct. 27, 2000 (TW) ...................................... 89218921 U

(51) Int. Cl.⁷ ................................................ A47J 31/00
(52) U.S. Cl. .............................. 99/320; 99/323; 99/279
(58) Field of Search ......................... 99/320, 319, 317, 99/323, 318, 321, 322, 279

(56) References Cited

U.S. PATENT DOCUMENTS

| 2,450,177 A | * | 9/1948 | Allen ........................... 99/320 |
| 2,741,174 A | * | 4/1956 | Casey ....................... 99/319 X |
| 4,401,014 A | * | 8/1983 | McGrail et al. .......... 99/320 X |
| 5,570,623 A |   | 11/1996 | Lin .............................. 99/285 |

\* cited by examiner

*Primary Examiner*—Reginald L. Alexander

(57) ABSTRACT

A device for preparing coffee or tea or milk includes a container slidably received in a receptacle for receiving the tea leaves or the coffee beans and/or the coffee grounds to be made. A float is attached to the bottom portion of the container for floating the container and for disengaging the tea leaves or the coffee beans and/or the coffee grounds from the fluid or the beverage in the receptacle. A latch is pivotally secured to the receptacle and includes a tongue for engaging with and for positioning the container relative to the receptacle.

10 Claims, 3 Drawing Sheets

DEVICE FOR PREPARING COFFEE, TEA OR MILK BEVERAGE

BACKGROUND OF THE INVENTION

1. Field of the Invention

The present invention relates to a device, and more particularly to a device for making or preparing a coffee, tea, or milk beverage.

2. Description of the Prior Art

U.S. Pat. No. 5,570,623 to Lin discloses one of the typical tea or coffee making devices and comprises a filter screen slidably received in a container for agitating or forcing or compressing and for making or preparing the tea or coffee or milk beverage. However, the filter screen may not remove the tea leaves or the coffee beans and/or the coffee grounds may not be removed from the beverage and may still be immersed within the beverage before the beverage has been drunk up. When or after the tea leaves or the coffee beans and/or the coffee grounds are immersed within the beverage for a long time, the beverage may be too thick or too black or too dense and will be not good for drinking.

The present invention has arisen to mitigate and/or obviate the afore-described disadvantages of the conventional tea or coffee making devices.

SUMMARY OF THE INVENTION

The primary objective of the present invention is to provide a coffee or tea or milk preparing or making device including a container for containing and for removing the tea leaves or the coffee beans and/or the coffee grounds from the beverage and for preventing the tea leaves or the coffee beans and/or the coffee grounds from being immersed within the beverage for too long.

The other objective of the present invention is to provide a coffee or tea or milk preparing or making device including a latching or retaining device for retaining the tea leaves or the coffee beans and/or the coffee grounds containing container in a receptacle at the selected position.

In accordance with one aspect of the invention, there is provided a device for preparing coffee or tea or milk or the like, the device comprising a receptacle, a container slidably received in the receptacle for receiving an object, such as the tea leaves, the coffee beans and/or the coffee grounds to be made, means for floating the container to move the container upward along the receptacle, and means for positioning the container relative to the receptacle in order to determine or to disengage the tea leaves, the coffee beans and/or the coffee grounds from the fluid or the beverage contained in the receptacle.

The container includes a bottom portion, the floating means includes a float attached to the bottom portion of the container for floating the container and for disengaging the tea leaves, the coffee beans and/or the coffee grounds from the fluid or the beverage contained in the receptacle.

The positioning means includes a latch having a tongue for engaging with the container and for positioning the container relative to the receptacle.

The receptacle includes a groove formed therein for receiving the latch and for allowing the tongue of the latch to be disengaged from the container.

The latch includes an upper portion pivotally secured to the receptacle with a pivot pin, and includes a lower portion having the tongue extended therefrom for engaging with the container and for positioning the container relative to the receptacle.

The container includes at least one cavity formed therein for receiving the tongue and for allowing the container to be secured or retained to the receptacle at the different heights or positions.

The floating means includes a float attached to the bottom portion of the container for floating the container, the float includes at least one cavity formed therein for receiving the tongue and for allowing the container to be secured or retained to the receptacle at the different heights or positions.

The tongue of the latch includes an inclined upper surface for allowing the container to move downward relative to the tongue and thus for allowing the container to move downward relative to the receptacle.

The tongue of the latch includes a flat bottom surface for engaging with the container and for preventing the tongue from being disengaged from the container and for positioning the container relative to the receptacle.

The latch includes an upward extending handle for rotating the latch and for disengaging the tongue from the container.

A device is further provided for guiding the container to move up and down relative to the receptacle and includes at least one guide rib extended inward of the receptacle for engaging with the container and for guiding the container to move up and down relative to the receptacle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
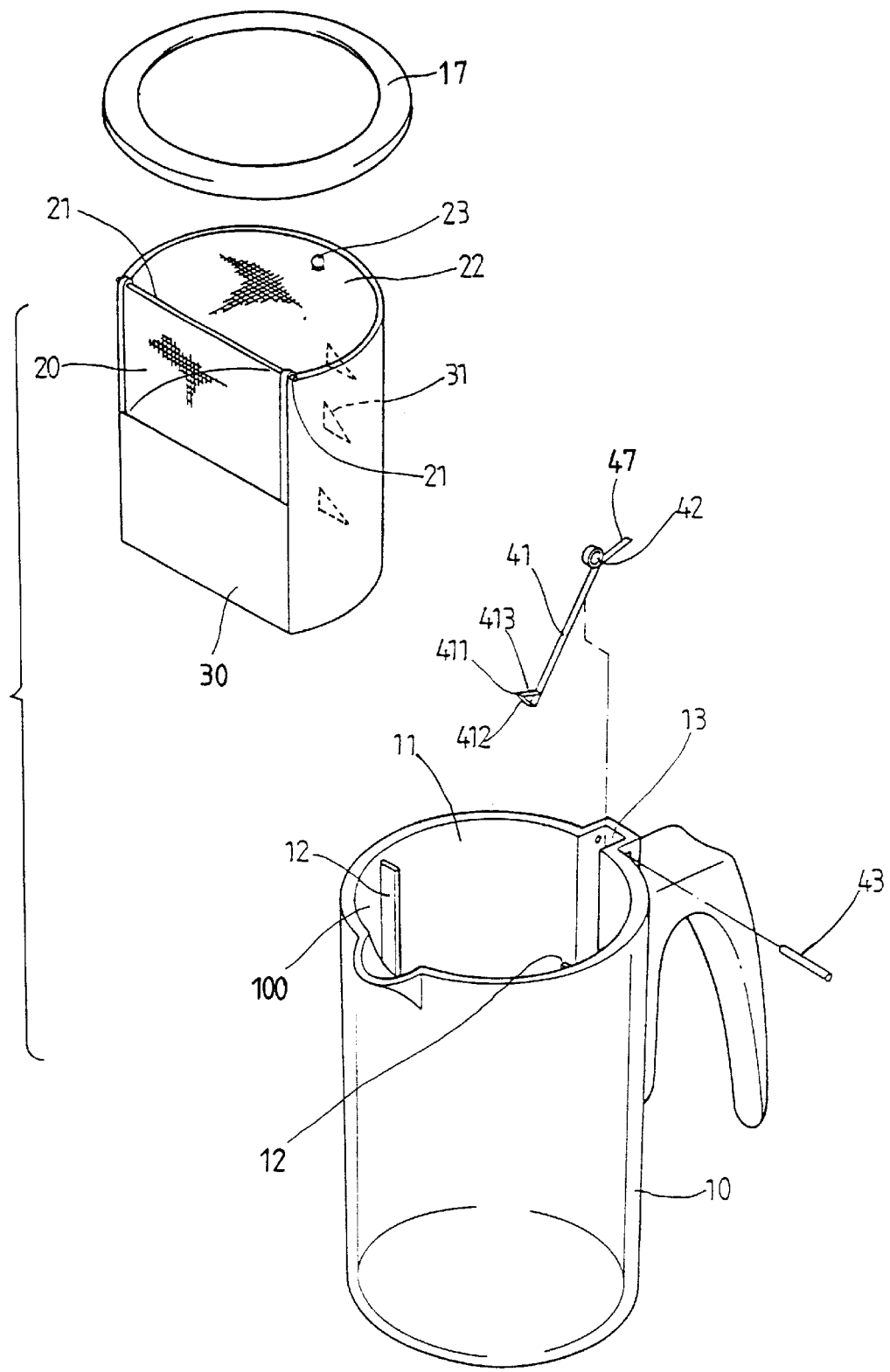
FIG. 1 is an exploded view of a coffee or tea or milk preparing or making device in accordance with the present invention.
Figure 2:
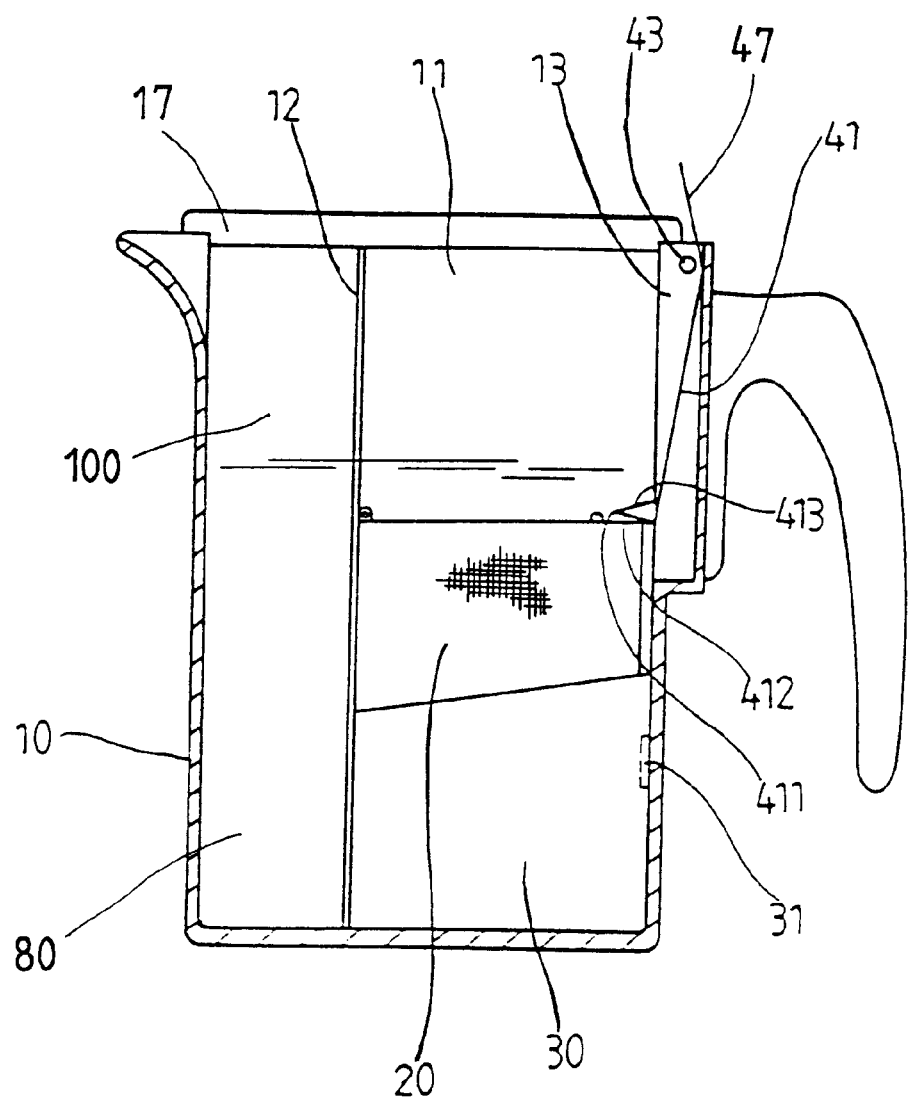
FIG. 2 is a partial cross sectional view of the coffee or tea or milk preparing or making device.

Referring to the drawings, and initially to FIGS. 1 and 2, a coffee or tea or milk preparing or making device in accordance with the present invention comprises a receptacle 10 including a chamber 100 formed or provided therein for receiving the water or the beverage 80 to be prepared or made, and including one or more guide flaps or panels or bars or ribs 12 extended inward of the chamber 100 thereof for forming a guide channel 11 therein and for slidably receiving a container 20 therein and for guiding the container 20 to move up and down relative to the receptacle 10 and for preventing the container 20 from moving laterally relative to the receptacle 10. The receptacle 10 includes a groove 13 formed therein and communicating with the chamber 100 and the guide channel 11 thereof.

The container 20 is provided for receiving the object to be made, such as the milk, or the tea leaves, or the coffee beans and/or the coffee grounds, and includes one or more peripheral sides or portions formed or defined or manufactured with net or screen members, for allowing the beverage or the other fluid to flow into the container 20, and for allowing the milk, or the tea leaves, or the coffee beans and/or the coffee grounds to be immersed within the fluid or the beverage 80 (FIG. 2). A cap 22 is rotatably or pivotally secured to the upper portion of the container 20 with a pivot axle 21 and is also preferably made of net or screen members, for allowing the beverage or the other fluid to flow into the container 20. A knob 23 is attached to the cap 22 for opening and closing the cap 22 and for allowing the milk, or the tea leaves, or the coffee beans and/or the coffee grounds to be engaged into or removed from the container 20.

Figure 3:
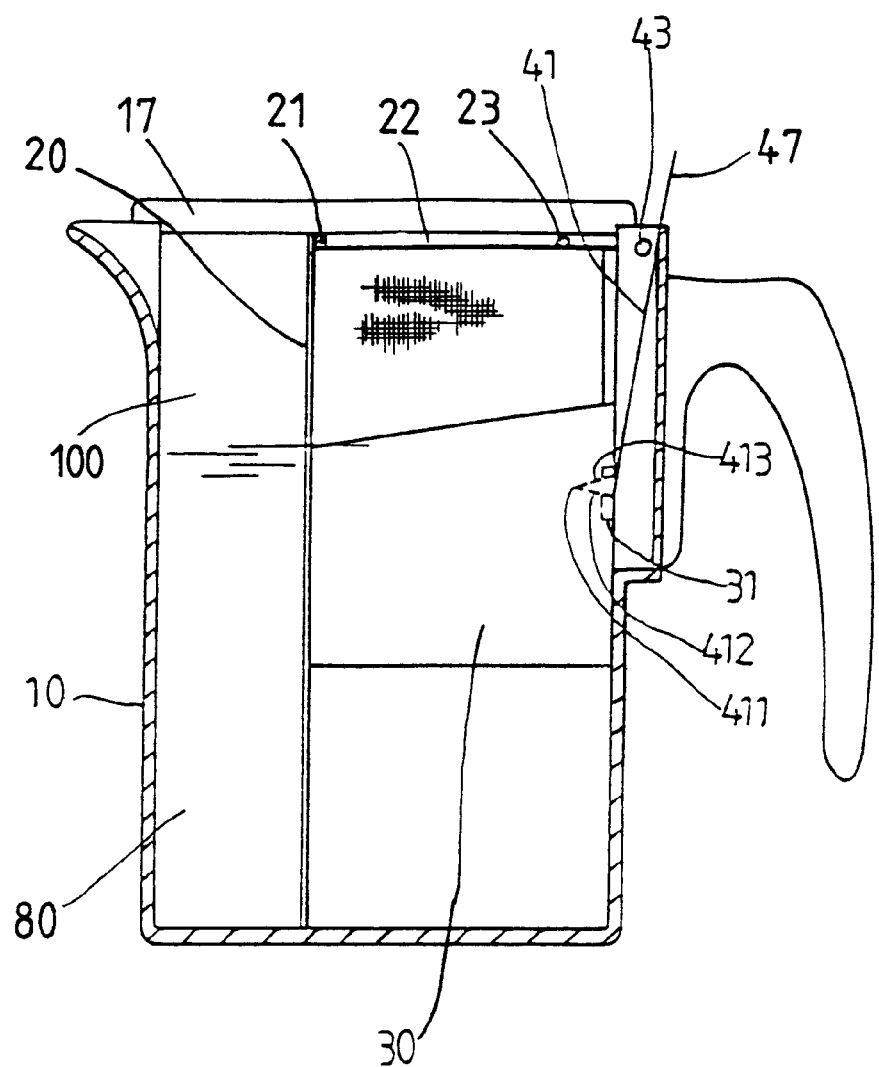
FIG. 3 is a partial cross sectional view similar to FIG. 2, illustrating the operation of the coffee or tea or milk preparing or making device.

A float 30 is disposed or provided or attached to the bottom portion of the container 20 for floating the container 20 upon the beverage 80 that is contained within the receptacle 10 (FIG. 3), and for allowing the tea leaves, or the coffee beans and/or the coffee grounds to be disengaged from the fluid or the beverage 80 contained in the receptacle 10 and for preventing the tea leaves or the coffee beans and/or the coffee grounds from being immersed within the fluid or the beverage for too long. A cover 17 may be selectively engaged on top of the receptacle 10 for limiting the upward movement of the container 20 relative to the receptacle 10, and for preventing the container 20 from being jump up and disengaged from the receptacle 10. The container 20 and/or the float 30 includes one or more cavities 31 formed therein, and preferably formed in one side thereof and arranged in line with each other, or arranged up and down along the longitudinal direction of the container 20.

A latch 41 is received in the groove 13 of the receptacle 10, and includes a ring 42 disposed or provided on the upper portion thereof for rotatably or pivotally securing to the upper portion of the receptacle 10 with a pivot pin 43, and includes a catch or a tongue 411 extended laterally from the lower portion thereof for engaging with either of the cavities 31 of the container 20 and/or of the float 30. The tongue 411 includes an inclined upper surface 413 for allowing the container 20 to be moved downward relative to the receptacle 10 and the tongue 411 of the latch 411, and includes a flat bottom surface 412 for engaging with the upper portion of the container 20 (FIG. 2) or for engaging into either of the cavities 31 of the container 20 and/or of the float 30 (FIG. 3) and for retaining or positioning the container 20 relative to the receptacle 10 at the predetermined or required or suitable or selected position, and for removing or disengaging the tea leaves or the coffee beans and/or the coffee grounds from the beverage and for preventing the tea leaves or the coffee beans and/or the coffee grounds from being immersed within the beverage for too long. The latch 41 includes a handle 47 extended upward from the ring 42 thereof and extended upward and outward of the receptacle 10, for rotating the latch 41 to move the tongue 411 into the groove 13 of the receptacle 10 and for disengaging the tongue 411 from the container 20 or the cavities 31 of the container 20 and/or of the float 30.

In operation, as shown in FIG. 2, the tea leaves or the coffee beans and/or the coffee grounds may be engaged into the container 20, and the container 20 may then be moved downward or inward of the receptacle 10, until the tongue 411 of the latch 41 is engaged with the top of the container 20, such that the container 20 may be retained within the receptacle 10. The float 30 may apply a floating or buoying force against the container 20 to float or buoy the container 20 upward against the tongue 411 of the latch 41 such that the latch 41 may thus be forced to engage with the container 20 and may retain the container 20 to the receptacle 10 when the handle 47 or the latch 41 is released The fluid or the hot water may then be poured into the container 20 for allowing the tea leaves or the coffee beans and/or the coffee grounds to be immersed within the hot water and for allowing the beverage to be made.

When or after the beverage has been made, the handle 47 of the latch 41 may be actuated to disengage the tongue 411 from the container 20. The float 30 may then float or move the container 20 upward along the channel 11 of the receptacle 10. The handle 47 of the latch 41 may be actuated to force the tongue 411 of the latch 41 against the container 20, such that the tongue 411 may be forced to engage with either of the cavities 31 of the container 20 and/or of the float 30. Particularly, the tongue 411 may be forced to engage with the uppermost cavity 31 of the container 20 and/or of the float 30 when the float 30 floats or buoys the container 20 upward relative to the receptacle 10. The handle 47 of the latch 41 may be actuated to disengage the tongue 411 of the latch 41 from the container 20 and may be actuated or forced to engage with either of the other cavities 31 of the container 20 and/or of the float 30 (FIG. 3) and for latching or retaining or positioning the container 20 relative to the receptacle 10 at the predetermined or required or suitable or selected position, and for determining or positioning the tea leaves or the coffee beans and/or the coffee grounds relative to or from the beverage and for preventing the tea leaves or the coffee beans and/or the coffee grounds from being immersed within the beverage for too long. Some or all of the tea leaves or the coffee beans and/or the coffee grounds may thus be determined or controlled to be disposed or immersed in the beverage by latching the tongue 411 in the selected cavities 31, for determining or controlling the thickness or the dense of the beverage.

It is to be noted that the receptacle 10 may be made to a large volume and having the container 20 slidably received therein with the guide ribs 12. Alternatively, the container 20 may also be slidably received in the receptacle 10 without the guide ribs 12, or may be guided to slide relative to the receptacle 10 by the specially designed mating shapes or configurations between the receptacle 10 and the container 20.

Accordingly, the coffee or tea or milk preparing or making device in accordance with the present invention includes a container for containing and for removing the tea leaves or the coffee beans and/or the coffee grounds from the beverage and for preventing the tea leaves or the coffee beans and/or the coffee grounds from being immersed within the beverage for too long. The device includes a latching or retaining device for retaining the tea leaves or the coffee beans and/or the coffee grounds containing container in a receptacle at the selected position.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A device for preparing coffee or tea or milk or the like, said device comprising:
   a receptacle,
   a container slidably received in said receptacle for receiving an object to be made,
   means for floating said container to move said container upward along said receptacle,
   means for positioning said container relative to said receptacle, and
   means for guiding said container to move up and down relative to said receptacle, said guiding means including at least one guide rib extended inward of said receptacle for engaging with said container and for guiding said container to move up and down relative to said receptacle.

2. The device according to claim 1, wherein said container includes a bottom portion, said floating means includes a float attached to said bottom portion of said container for floating said container.

3. The device according to claim 1, wherein said positioning means includes a latch having a tongue for engaging with said container and for positioning said container relative to said receptacle.

4. The device according to claim 3, wherein said tongue of said latch includes an inclined upper surface for allowing said container to move downward relative to said tongue and said receptacle.

5. The device according to claim 3, wherein said tongue of said latch includes a flat bottom surface for engaging with said container and for positioning said container relative to said receptacle.

6. A device for preparing coffee or tea or milk or the like, said device comprising:

a receptacle, a container slidably received in said receptacle for receiving an object to be made, means for floating said container to move said container upward along said receptacle, and means for positioning said container relative to said receptacle, said positioning means including a latch having a tongue for engaging with said container and for positioning said container relative to said receptacle, and said receptacle including a groove formed therein for receiving said latch.

7. A device for preparing coffee or tea or milk or the like, said device comprising:

a receptacle, a container slidably received in said receptacle for receiving an object to be made, means for floating said container to move said container upward along said receptacle, and means for positioning said container relative to said receptacle, said positioning means including a latch having a tongue for engaging with said container and for positioning said container relative to said receptacle, and said latch including an upper portion pivotally secured to said receptacle with a pivot pin, and including a lower portion having said tongue extended therefrom for engaging with said container and for positioning said container relative to said receptacle.

8. A device for preparing coffee or tea or milk or the like, said device comprising:

a receptacle, a container slidably received in said receptacle for receiving an object to be made, means for floating said container to move said container upward along said receptacle, and means for positioning said container relative to said receptacle, said positioning means including a latch having a tongue for engaging with said container and for positioning said container relative to said receptacle, and said container including at least one cavity formed therein for receiving said tongue.

9. A device for preparing coffee or tea or milk or the like, said device comprising:

a receptacle, a container slidably received in said receptacle for receiving an object to be made, means for floating said container to move said container upward along said receptacle, and means for positioning said container relative to said receptacle, said positioning means including a latch having a tongue for engaging with said container and for positioning said container relative to said receptacle, and said floating means including a float attached to said bottom portion of said container for floating said container, said float including at least one cavity formed therein for receiving said tongue.

10. A device for preparing coffee or tea or milk or the like, said device comprising:

a receptacle, a container slidably received in said receptacle for receiving an object to be made, means for floating said container to move said container upward along said receptacle, and means for positioning said container relative to said receptacle, said positioning means including a latch having a tongue for engaging with said container and for positioning said container relative to said receptacle, and said latch including an upward extending handle for disengaging said tongue from said container.

* * * * *